(12) United States Patent
Dasgupta et al.

(10) Patent No.: US 11,038,896 B2
(45) Date of Patent: *Jun. 15, 2021

(54) ADAPTIVE MULTI-FACTOR AUTHENTICATION SYSTEM WITH MULTI-USER PERMISSION STRATEGY TO ACCESS SENSITIVE INFORMATION

(71) Applicants: Dipankar Dasgupta, Germantown, TN (US); Arunava Roy, Memphis, TN (US); Debasis Ghosh, Raleigh, NC (US); Abhijit Kumar Nag, Memphis, TN (US)

(72) Inventors: Dipankar Dasgupta, Germantown, TN (US); Arunava Roy, Memphis, TN (US); Debasis Ghosh, Raleigh, NC (US); Abhijit Kumar Nag, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,839

(22) Filed: Apr. 18, 2019

(65) Prior Publication Data

US 2020/0014702 A1    Jan. 9, 2020

Related U.S. Application Data

(63) Continuation-in-part of application No. 15/949,111, filed on Apr. 10, 2018, and a continuation-in-part of (Continued)

(51) Int. Cl.
*H04L 29/06* (2006.01)

(52) U.S. Cl.
CPC .......... *H04L 63/105* (2013.01); *H04L 63/083* (2013.01); *H04L 63/0861* (2013.01);
(Continued)

(58) Field of Classification Search
CPC ............... H04L 63/105; H04L 63/1416; H04L 63/0861; H04L 63/083; H04L 63/20;
(Continued)

(56) References Cited

U.S. PATENT DOCUMENTS 8,272,061 B1 *   9/2012   Lotem ................. H04L 63/1433
                                                                 726/25
9,807,101 B1 *  10/2017   Lu ......................... H04L 63/105
(Continued)

*Primary Examiner* — Aravind K Moorthy
(74) *Attorney, Agent, or Firm* — Wayne Edward Ramage; Baker Donelson

(57) ABSTRACT

Systems and related methods for providing greater security and control over access to protected or classified resources, files and documents and other forms of sensitive information based upon an initial adaptive selection of multiple modalities for authentication in different operating environments, with subsequent multi-user permission strategy centering on organizational structure. The system calculates trustworthiness values of different authentication factors under various environmental settings, and combines a trust-based adaptive, robust and scalable software-hardware framework for the selection of authentication factors for continuous and triggered authentication with optimal algorithms to determine the security parameters of each of the authentication factors. A subset of authentication factors thus are determined for application at triggering events on-the-fly, thereby leaving no exploitable a priori pattern or clue for hackers to exploit. Upon authentication of an access request, based on the sensitivity or classification of the information being requested by a user, approvers are selected dynamically based on the work environment (e.g., mobility, use of the computing device seeking access, access policy, and the like). The selected sets of approvers are non-repetitive in nature.

15 Claims, 16 Drawing Sheets

Related U.S. Application Data application No. 15/932,439, filed on Apr. 10, 2017, now Pat. No. 10,671,747, which is a continuation-in-part of application No. 14/968,676, filed on Dec. 14, 2015, now Pat. No. 9,912,657.

(60) Provisional application No. 62/652,411, filed on Apr. 4, 2018, provisional application No. 62/262,626, filed on Dec. 3, 2015, provisional application No. 62/169,991, filed on Jun. 2, 2015.

(52) U.S. Cl.
CPC .......... H04L 63/1416 (2013.01); H04L 63/20 (2013.01); *H04L 2463/082* (2013.01)

(58) Field of Classification Search
CPC . H04L 2463/082; H04L 63/08; H04L 63/205; G06F 21/45; G06F 21/31
See application file for complete search history.

(56) References Cited

U.S. PATENT DOCUMENTS

| | | | |
|---|---|---|---|
| 10,432,639 B1* | 10/2019 | Bebee | G06F 16/90335 |
| 10,671,747 B2* | 6/2020 | Dasgupta | G06F 21/40 |
| 2010/0235879 A1* | 9/2010 | Burnside | H04L 63/1425 726/1 |
| 2014/0033267 A1* | 1/2014 | Aciicmez | H04L 63/20 726/1 |
| 2014/0250489 A1* | 9/2014 | Calo | H04L 63/20 726/1 |
| 2015/0242605 A1* | 8/2015 | Du | G06F 21/32 726/7 |
| 2016/0072842 A1* | 3/2016 | Greenbaum | H04L 63/102 726/1 |
| 2016/0359915 A1* | 12/2016 | Gupta | H04L 63/20 |
| 2017/0012984 A1* | 1/2017 | Dang | G06F 16/1873 |
| 2017/0264643 A1* | 9/2017 | Bhuiyan | G06F 40/211 |
| 2017/0272442 A1* | 9/2017 | Klimovs | H04L 63/101 |
| 2017/0353453 A1* | 12/2017 | Hutchinson | H04L 63/20 |
| 2017/0359379 A1* | 12/2017 | Elliot | H04L 63/08 |
| 2017/0364702 A1* | 12/2017 | Goldfarb | H04L 63/14 |
| 2018/0109507 A1* | 4/2018 | Caldera | G06N 20/00 |
| 2018/0139096 A1* | 5/2018 | Lee | H04L 41/0893 |
| 2018/0196928 A1* | 7/2018 | Gilpin | H04W 12/06 |
| 2018/0211056 A1* | 7/2018 | Delisser | G06F 21/6218 |
| 2018/0227185 A1* | 8/2018 | Turner | H04L 63/20 |
| 2018/0357845 A1* | 12/2018 | Berg | G07C 9/00571 |
| 2019/0081954 A1* | 3/2019 | Xu | H04L 63/102 |
| 2019/0114369 A1* | 4/2019 | Sloane | G06F 16/9024 |
| 2019/0130124 A1* | 5/2019 | Dasgupta | H04L 63/105 |
| 2019/0251272 A1* | 8/2019 | Ravizza | G06F 21/6227 |
| 2019/0312881 A1* | 10/2019 | Dasgupta | H04L 63/105 |

* cited by examiner

| Modality | Computational Features | Summary |
|---|---|---|
| Face (M1) 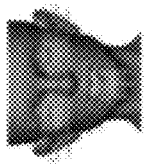 110 | Lip: Lip center position($x_c$ and $y_c$), the lip shape ($h_1$, $h_2$ and w), lip orientation ($\theta$) Eye: a circle with three parameters ($x_0$, $y_0$ and r) for Iris; two parabolic arcs with six parameters($x_c$, $y_c$, $h_1$, $h_2$, w, $\theta$) to model boundaries of eye; The last one differs in closed and open eye position. Brow and Check: Left and right brow: triangular template with six parameters (x1, y1), (x2, y2) and (x3, y3). Cheek has six parameters (both up and downward triangle template) Both brow and cheek templates are tracked using Lucas-Kanade algorithm | Lip: f1, f2 and f3. Eye: f4, f5 Brow and Check: f6, f7 Total: 7 category features |

FIG. 4

| Modality | Computational Features | Summary |
|---|---|---|
| Fingerprint (M2) | Level 1 features(Global Fingerprint features): singular points, ridge orientation map, ridge frequency map<br><br>Level 2 feature: ridge ending and ridge bifurcation. Minutiae location and orientation. Each of them is combination of a good number of features. But they combine make a unique identification of a feature.<br><br>Level 3 features: sweat pores. Pores are considered to be highly distinctive in terms of their number, position, and shape. identification of a feature.<br><br>Level 3 features: sweat pores. Pores are considered to be highly distinctive in terms of their number, position, and shape. | Level1: f1, f2, f3<br>Level2: f4, f5<br>Level3: f6<br>Total: 6 category feature |

| Modality | Computational Features | Summary |
|---|---|---|
| Password (M3)  130 | 1. Master password<br>2. Key pattern<br>3. Security question<br>4. Profile information | Total: 4 types |
| CAPTCHA (M4)  140 | 1. only numbers<br>2. only characters<br>3. alphanumeric characters<br>4. pictorial CAPTCHA | Total: 4 types |
| SMS (M5)  170 | 1. any number or character<br>2. emoticon<br>3. special character sequence showing a message | Total: 3 types |
| Voice (M6)  150 | Pitch, different formant features (F1, F2 and F3) | Total: 4 features (but each of them are vectors not a scalar quantity) |
| Keystroke (M7) 160 | 1. Key hold time (how long a key is pressed)<br>2. Error Rate (number of times backspace is pressed)<br>3. Horizontal Digraph: time to switch between horizontally adjacent keys<br>4. Vertical Digraph: time to switch between vertically adjacent keys<br>5. Non-Adjacent Horizontal Digraph: time to switch between non-adjacent horizontal keys<br>6. Non-Adjacent Vertical Digraph: time to switch between non-adjacent vertical keys | Total: 6 features |

FIG. 6

| Device Type | Connection Media | | Environment | Frequency of Authentication | No. of Modalities Activated |
|---|---|---|---|---|---|
| Fixed Device | Wired | | Private | Semi-static | small |
| | Wireless | | Public with Login | Semi-static | medium |
| Portable Device | Wired | | Public with Login | Semi-static | medium |
| | | | Private | Static | small |
| | Wireless | | Public with Login | Semi-static | medium |
| Handheld Device | | | Public Hotspot | Dynamic | large |
| | Wireless | | Public with Login | Semi-static | medium |
| | | | Public Hotspot | Dynamic | large |
| | Cellular | | Public with Login | Semi-static | medium |
| | | | Public with Login | Semi-static | medium |
| Internet of Things | Wired | | Private | Static | medium |
| | Wireless | | Public with Login | Semi-static | large |

FIG. 7

| SYMBOL | DESCRIPTION |
|---|---|
| $\mathbb{Z}^+$ | An Organization |
| $\{O_j\}_{j \in \mathbb{Z}^+}$ | j-th object in an Organization |
| $\{S_m\}_{m \in \mathbb{Z}^+}$ | Degree of m sensitivity of an object in an Organization |
| $\{P_m\}_{m \in \mathbb{Z}^+}$ | Number of permissions required for degree of m sensitivity of an object in an Organization |
| $\{R_i\}_{i \in \mathbb{Z}^+}$ | i-th role in an Organization |
| $\{A_i[j]\}_{i,j \in \mathbb{Z}^+}$ | j-th activity of the i-th role in an Organization |
| $\{E_{ij}\}$ | Employees working on activity j and role i |
| $E$ | Number of employees in an Organization |
| $\theta_{N_1 \times N_1}$ | An initiator or generator of Stochastic Kronecker Graphs (SKG) |
| $P \otimes Q$ | Kronecker product of two adjacency matrices of graphs P and Q |

FIG. 9

| $R_j$ | $A_i[1]$ | $A_i[2]$ | $A_i[3]$ | $A_i[4]$ | $A_i[5]$ | $A_i[6]$ | $A_i[7]$ |
|---|---|---|---|---|---|---|---|
| Managing Director ($R_6$) | Publish with Final Approval $A_6[1]$ | Approve Object Creation and Release to Application Team $A_6[2]$ | Approve for Script Scheduling $A_6[3]$ | Approval for Patch Plan $A_6[4]$ | Approval of DB Access $A_6[5]$ | $A_6[6]$ | Approval of Application Access $A_6[7]$ |
| Manager ($R_5$) | Approve Design $A_5[1]$ | Review DB Objects $A_5[2]$ | Plan for Script Scheduling $A_5[3]$ | Review Plan for System Outage and Apply Patch $A_5[4]$ | Review the DB Access Request $A_5[5]$ | Approve Restore Request $A_5[6]$ | Review the Application Access Request $A_5[7]$ |
| Principal Design DBA ($R_4$) | System Design Review $A_4[1]$ | Create DB Objects $A_4[2]$ | Review Script Requirement and Design $A_4[3]$ | DB Patch Analysis and Plan for System Outage and Apply Patch $A_4[4]$ | Review the DB Roles needs to be provided $A_4[5]$ | Restore DB/OS $A_4[6]$ | Define the Data View Options in the Application $A_4[7]$ |
| Senior Design DBA ($R_3$) | System Design $A_3[1]$ | Create Database $A_3[2]$ | Script Design $A_3[3]$ | Patch Analysis and Apply Patch $A_3[4]$ | Define the Roles needs to be provided $A_3[5]$ | Push OS and DB Patch as OS Admin $A_3[6]$ | Review Application Logs & Error at the Backend, Analyze similar related patches, and DB Patch Request $A_3[7]$ |
| Design DBA ($R_2$) | Review System Study $A_2[1]$ | Review DDL $A_2[2]$ | Build Script $A_2[3]$ | Copy Patch to the Target $A_2[4]$ | Create DB Access $A_2[5]$ | Backup System Admin & OS Admin $A_2[6]$ | Create Application Access $A_2[7]$ |
| Jr. Design DBA ($R_1$) | System Study $A_1[1]$ | Create DDL $A_1[2]$ | Schedule Scripts $A_1[3]$ | Download Patch $A_1[4]$ | Receive the DB Access Request $A_1[5]$ | Backup both DB & File System $A_1[6]$ | Receive Application Access $A_1[7]$ |

FIG. 12

| Common employees working on different activities of specific Roles |
|---|
| $E_{34} \cap E_{36} = 15$ |
| $E_{34} \cap E_{37} = 18$ |
| $E_{24} \cap E_{26} = 21$ |
| $E_{15} \cap E_{17} = 28$ |

FIG. 13

| Types of Documents | Time (t) | Selected set of Permission Approvers |
| --- | --- | --- |
| Top Secret (3 permissions needed) | $t=0$ | $\{E_{12}[1], E_{32}[7], E_{42}[19]\}$ |
| | $t=1$ | $\{E_{12}[11], E_{32}[1], E_{42}[11]\}$ |
| | $t=2$ | $\{E_{12}[1], E_{42}[5], E_{42}[12]\}$ |
| | $t=3$ | $\{E_{12}[16], E_{32}[7], E_{42}[7]\}$ |
| | $t=4$ | $\{E_{22}[1], E_{32}[14], E_{42}[8]\}$ |
| | ... | ... |

FIG. 15

| Types of Documents | Time ($t$) | Selected set of Permission Approvers |
|---|---|---|
| Secret (2 permissions needed) | $t = 0$ | $\{E_{12}[1], E_{32}[10]\}$ |
| | $t = 1$ | $\{E_{12}[11], E_{42}[11]\}$ |
| | $t = 2$ | $\{E_{12}[15], E_{42}[8]\}$ |
| | $t = 3$ | $\{E_{12}[13], E_{32}[10]\}$ |
| | $t = 4$ | $\{E_{12}[11], E_{32}[5]\}$ |
| | ... | ... |

FIG. 16

ADAPTIVE MULTI-FACTOR AUTHENTICATION SYSTEM WITH MULTI-USER PERMISSION STRATEGY TO ACCESS SENSITIVE INFORMATION

This application is a continuation-in-part application of U.S. patent application Ser. No. 15/949,111, filed Apr. 10, 2018, which claims benefit of and priority to U.S. Provisional Applications Nos. 62/652,411, filed Apr. 4, 2018, and 62/483,716, filed Apr. 10, 2017, by Dipankar Dasgupta, et al.; and also is a continuation-in-part application of U.S. patent application Ser. No. 15/932,439, filed Apr. 10, 2017, which is a continuation-in-part application of U.S. patent application Ser. No. 14/968,676, filed Dec. 14, 2015, now U.S. Pat. No. 9,912,657, issued Mar. 6, 2018, which claims benefit of and priority to U.S. Provisional Applications Nos. 62/262,626, filed Dec. 4, 2015, and 62/169,991, filed Jun. 2, 2015; all of which are incorporated herein by specific reference in their entireties, including complete disclosures, specifications, drawings, and appendices thereof, for all purposes.

FIELD OF INVENTION

This invention relates to a system and method for controlling computer-based access to classified or protected files and documents, or other sensitive information. More particularly, this invention relates to a system and related methods for multi-factor authentication of user identity for access to a computing device, system, or resource, including access through the Internet.

BACKGROUND OF THE INVENTION

At present, many user activities rely upon trusted and secure access to various computing or cyber devices, systems, resources, or services. Authentication is the main defense to address the issue of illegitimate access. Basic authentication processes using a single factor (e.g., user ID and password) are widely used, but have significant problems. Such systems are relatively easy to breach, and, in addition, if the single factor authentication system fails, the user cannot access the system.

Multi-factor authentication (MFA) systems have been developed to help increase secure access. Two-factor authentication systems, for example, check for two different factors at the time of accessing a computer-based online service. However, with the increasing sophistication of technology, these systems do not provide adequate security in many cases. From a security perspective, the critical question for MFA systems is what authentication factors need to be employed in different operating conditions in order to address authentication-related security breaches in a better way. Existing MFA systems generally follow static factor selection policies that do not choose the authentication factors based on present security risks of dynamic operating environments. As a result, the use of the same set of authentication factors in all situations becomes less effective and more predictable, and their vulnerabilities get exposed to hackers.

Exfiltration of sensitive data and intellectual property theft have increased to a significant level affecting both government agencies as well as small to large businesses. One of the major sources of data breaches is malicious insiders who have the access rights, knowledge of data values and technical know-how to escalate their privileges in launching such insider attacks. Traditional access control policies (to shared data and computing resources) have been framed according to the trust on legitimate users' access rights (e.g., read, write and execute) based on their jobs and role hierarchy in an organization. However, such access privileges are increasingly being misused by hostile, oblivious, rogue and pseudo-insiders.

Traditionally, all devices and data were under the domain of an organization, and attacks were either from insiders or outsiders, as the network parameters were well-defined. With the advent of cloud computing, increased mobility, and the use of personal devices (bring-your-own-device, or BYOD), a vast amount of data are now distributed across customers, service providers, and other third-party storage, each with varying security capabilities and management policies. Due to these changes, exfiltration of sensitive data and intellectual property theft have increased to a significant level, affecting both government agencies as well as small to large businesses. Most data breaches are results of employee actions due to negligence, ignorance, misplaced intent, or curiosity.

However, malicious insiders who have the access rights, knowledge of data values and technical know-how of escalating their privileges are launching such insider attacks. Insider threats can be more damaging to an organization than outsider/intruder attacks, since there is a significant cost associated with the resolution of such insider attacks. It is estimated that insider attacks take on an average 20% more time than an external cyber-attack. Further, considering companies which experience data breach, insiders were responsible for 43% of data loss, half of these were intentional, and the other accidental. Insider threats cause high risks to all enterprises, regardless of their size, industry or region.

Attempts have been made to address insider threat issues, but with little success. Proposed solutions focus on analysis, detection, and prediction, with virtually no effect on insider attack prevention. The prevention of insider threats is a non-trivial task due to various factors, ranging from the complexities of defining insider threats to in-time detection of such threats. For example, organization typically use a mix of role-based access control and task-based policies, often with role hierarchies and constraints. Users get access based on their different administrative scopes in a role hierarchy in the organization. However, once the access (read, write, execute) is granted, the user typically can copy the requested resource. There exist very limited additional preventive measures over the access to sensitive information by legitimate users of an organization. In particular, the primary focus of prior art approaches is on access control administration based on the responsibilities assigned to specific employees, rather than on shared roles and responsibilities.

Accordingly, what is needed is a system providing greater security and control over access to classified files and documents and other forms of sensitive information.

SUMMARY OF INVENTION

In various exemplary embodiments, the present invention comprises a system and methodology for adaptive selection of multiple modalities for authentication in different operating environments, thereby making authentication strategy unpredictable so to significantly reduce the risk of exploitation by authentication-guessing attacks. This system incorporates a novel approach of calculating trustworthy values of different authentication factors under various environmental settings. The present system comprises: (i) a trust-based adaptive, robust and scalable software-hardware framework for the selection of authentication factors for continuous and triggered authentication; and (ii) stochastic optimal selection procedures to determine the best set of authentication factors through sensing devices, media, and surrounding conditions.

A subset of authentication factors are determined (at triggering events) on-the-fly, thereby leaving no exploitable a priori pattern or clue for hackers to exploit. Adaptive authentication provides legitimacy of user transactions with an added layer of access protection that does not rely on a priori selection or policy for the use of a set of authentication modalities. Robustness of the system is maintained through designing the framework so that if any authentication modality data is compromised, the system can still perform flawlessly using other non-compromised modalities. Scalability is provided by adding newly available authentication modalities with existing set of modalities, and generating as well as tuning the operating and configuration parameters for the added modalities.

The present invention addresses the challenges of integrating the cyber-physical operating environment, user preference, types of applications, and mode of communication by adaptively selecting a subset of authentication factors (biometric and non-biometric, active and passive) that are most trustworthy for specific operational environmental settings. No prior art authentication system supports adaptive and dynamic selection of multi-factor authentication incorporating the environment settings (e.g., device, medium, surrounding conditions, and the like) with a significant number of authentication modalities.

The present invention works with different varieties and combinations of computing devices (e.g., desktop, laptop, hand-held devices), operating media (e.g., wired, wireless, cellular connection), and surrounding or ambient conditions (e.g., lighting, noise, sound, motion).

In additional exemplary embodiments, the present invention further comprises a system and related methods for providing greater security and control over access to classified files and documents and other forms of sensitive information based upon a multi-user permission strategy centering on organizational structure. A user requests access to information or a resource using the MFA approach described above. If the multi-factor authentication process is passed, then based on the sensitivity or classification of the information or access being requested by a user, approvers are selected dynamically based on the work environment (e.g., mobility, use of the computing device seeking access, access policy, and the like).

The present invention first generates an access control graph for a subject organization, based on the interrelationship among employees and their roles in an organization. It then generates a set of permission grantors, who are allowed to approve the access request of a particular user at a given time. The system does this by finding a set of possible approvers for a user file access request based on potential approvers rank, availability, and other pertaining conditions. In several embodiments, the system incorporates the Key Result Area (KRA) of the employee. The number of separate permissions needed for approval may be based on the classification (secrecy) level. The system then determines in real time or near real time the set of permission approvers for the request. Selection of the set of approvers is non-repetitive, thereby reducing the change of manipulation of the permission approvers.

In several embodiments, the present system assumes that the organizational structure as a graph or network that depends on the inter-relationship of components. Each organization has a specific hierarchical employee structure, with corresponding roles and task assignments. Each employee has a role (or, in some case, multiple roles), and each role encompasses or requires different activities. The workflow in the organization is bi-directional, in order to optimize productivity and reduce wastage of human efforts. Organization files and documents are classified into different categories, and are archived. As discussed above, access to a particular file or document needs a specific number of approvals, based on the level of sensitivity.

The system thus mitigates privilege abuse risks by establishing a protocol of shared-responsibility among a group of users (e.g., employees in an organization). any request for accessing a classified or protected file or document needs approval from a set of approvers, rather than seeking approval from a single approver. The person requesting access does not know the set of approvers selected for a particular access request, and cannot determine their identities. Access and approver logs may be kept with proper retention for audit and risk analysis, such as when an incident is reported, as described below.

The present invention is applicable for various forms of organizations, enterprises, and governmental agencies. In several embodiments, the present invention comprises a method of accessing classified documents from an active archived system, in response to a user access request for classified data, information, or services. The system develops a multi-approver strategy to provide shared-trustworthiness access to the classified data, information and services. User access logs and approver logs are stored at a separate (which may be geographically separate) location under different control (thereby preventing a rogue "superuser" from accessing or erasing the log files to remove traces of malicious activities). These logs may be analyzed and a risk analysis performed when an unexpected or anomalous incident occurs. With high-bandwidth communication media and user-friendly applications on mobile computing devices, approvers will be able to grant or deny access requests in near real-time, so the delay in receiving access permission is bounded or limited.

Malicious or anomalous behavior provides feedback to the system for intelligently deciding the approvers for an particular user's access request, thereby forming a closed-loop data-breach prevention and detection framework.

The system design thus separates policy from the mechanisms of access control and execution of tasks. Today's organizations rely on either (one) uniform policy for all document access or on separate access policies for documents without other considerations such as human factors, organizational structure and work flow (tasks and activities), and non-technical attacks such as social-engineering or collusion. By separating all these facets and creating enforcement mechanisms, the shared-trust framework of the present invention provides the necessary flexibility for an organization yet gives the organization the control of setting the access policies for classified/sensitive documents while minimizing the effect of factors mentioned. The present system thus addresses issues such as, but not limited to, automatic enforcement of security policy, on-technical threats (e.g., social engineering and collusion). When a user requests access to a particular classified document, the response will be based on the shared trust policy from a set of users from the organization (based on the organization structure and role of the user) who are available at that instance of time to act as approvers notifying them to approve the request.

BRIEF DESCRIPTION OF THE DRAWINGS

FIGS. 4 through 6 show exemplary tables of different computational features for various modalities.

FIG. 7 shows an exemplary table of criteria for selecting authentication modalities.

FIG. 9 shows symbols used for organizational structure graphing.

FIG. 12 shows detailed descriptions of the activities from FIG. 11.

FIG. 13 shows a list of numbers of common employees working on different activities of specific roles for the organization of FIG. 11.

FIGS. 15 and 16 show examples of sequential selection of sets of permission approvers for "top secret" and "secret" documents for the organization of FIG. 11.

DETAILED DESCRIPTION OF EXEMPLARY EMBODIMENTS

In various exemplary embodiments, the present system provides an adaptive multi-factor authentication system and related methods that improves secure access to various computing devices, network-connected devices, systems, resources, or services. It allows for the checking of the authenticity of users not only at the initial time of accessing the service, but on an intermittent or continuous basis throughout the access period or session for a particular user. The system chooses the better or best set of a variety of authentication factors out of all possible choices for the given operating environment or conditions at the time of authentication. By adaptively selecting different factors, the present invention reduces the chances of compromising user identity and sensitive or confidential information throughout the access period or session.

Figure 1:
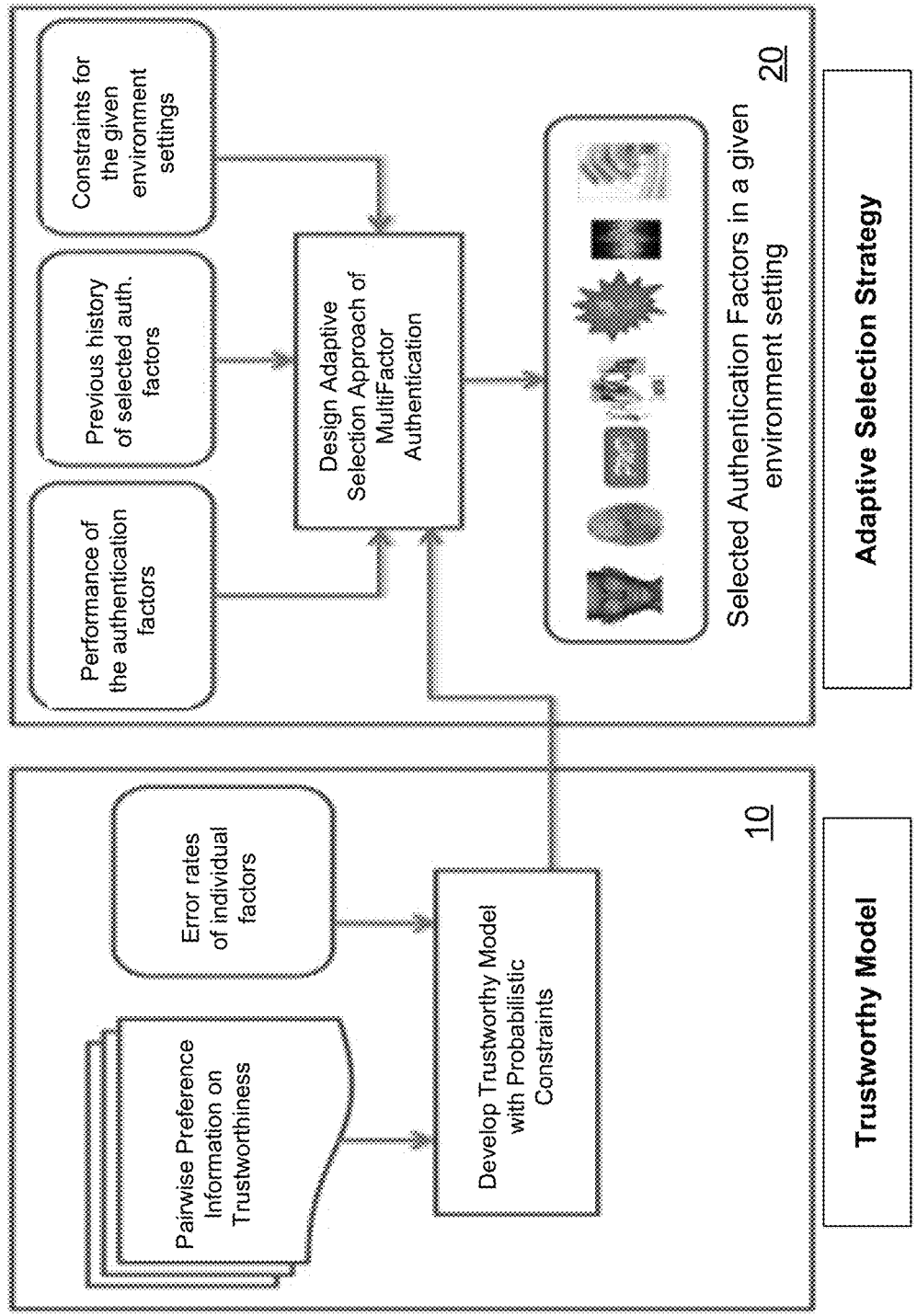
FIG. 1 shows a view of a system in accordance with an embodiment of the present invention.
Figure 2:
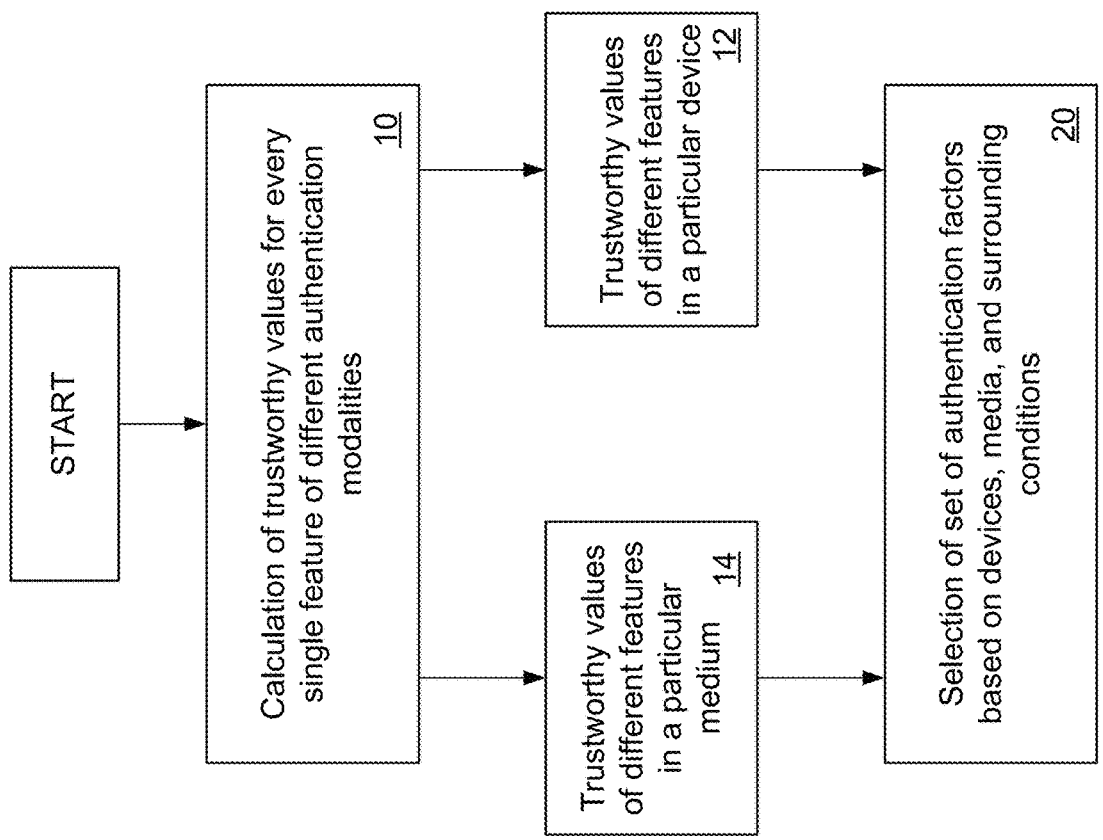
FIG. 2 is a diagram of a method in accordance with an embodiment of the present invention.

In one exemplary embodiment, as seen in FIGS. 1 and 2, the present invention comprises a mathematical model 10 for calculating the trustworthy values of different authentication factors. The trustworthy model computes the trust values for different authentication factors by considering several probabilistic constraints, and in particular, uses pair-wise comparisons among different devices 12 and media 14.

The system then adaptively selects 20 several authentication factors based on the devices, media and surrounding conditions involved, including history of the previous selection of authentication factors. The effects of surrounding conditions are considered in the selection of authentication factors as some factors may be depending on the presence or absence of certain conditions (e.g., light within a valid range is necessary for face recognition; sound within a valid range is required for voice recognition).

In one embodiment, the selected set of factors for any specific authentication attempt has higher total trustworthy values and performances than alternatives, and is different from previous sets of selected modalities if the device, medium and surrounding conditions are the same. This is determined by a multi-objective non-linear quadratic optimization process with probabilistic constraints.

Different modalities for authentication of user identity include, but are not limited to, facial recognition 110, fingerprint recognition 120, password 130, security token, CAPTCHA 140, voice recognition 150, keystroke recognition 160, and verification code through SMS 170. Facial recognition is a commonly used modality for authentication in portable and hand-held devices. In such modalities, skin color based technique is used for detecting frontal human faces from the input image. The visual features, namely Profile Fourier Coefficients, are then extracted using template matching. Facial recognition is also used to combat terrorism in highly congested public areas, such as airports and country border security checkpoints. It uses principal component analysis to get the required features. The fingerprint is an example of a robust biometric media, where improved minutiae extraction algorithm is used to get the required features. Sometimes fingerprint verification methods are used to increase the security of authentication in embedded systems. But this modality has more computational complexity in comparison with other existing biometric modalities.

Voice recognition is also a frequently used biometric modality for authentication. To do the recognition task, different levels of features are extracted for pronouncing vowels and consonants like spectral characteristics, duration, sequence of occurrence etc. The overall accuracy of authentication can be quite high when results for many individual measurements are combined. But this type of recognition lacks robustness in noisy environments or public gatherings.

Although the biometric modality has uniqueness as its features for identifying a specific human being, it also suffers some drawbacks and limitations, and as a result, it is not good to design an active authentication system based on only biometrics. False reading or compilation errors sometimes occurs among biometrics. This type of vulnerability (false acceptance rate and false rejection rate) is the greatest disadvantage. For instance, fingerprints can be forged through copying and even can be altered by transplant surgery. The facial features also may be changed through plastic surgery, or wearing masks or prosthetics, and such methods have been adopted by cybercriminals around the world in order to by-pass security systems. Moreover, an effective biometric system is costly in nature and unaffordable for small or medium size companies, unable to deploy continuous authentication systems on a large scale.

Biometric modalities like voice recognition or iris recognition are also not reliable in cases of illness. If a user suffers from throat infection or eye disease, these modalities cannot serve the authentication purpose if they are the sole metrics used in authentication.

Further, in many companies or institutions the employees work from remote locations where they need to login to their remote business workstations. In this scenario, biometric authentication is also untenable if the employee device does not have such capabilities. Passwords, PIN codes, and passive authentications like keystroke and mouse movement are better choices in those sorts of scenarios.

In various embodiments of the present invention, both biometric and non-biometric modalities are incorporated and the balances of these modalities in selection are ensured through the objective functions. The above-mentioned modalities are user interceptive. As the usage of mobile computing devices increases, user non-interceptive modalities are becoming more vital for continuous authentication. Examples of this type of modality are keystroke analysis and mouse dynamics, touch-based and accelerometer, and gyroscope readings on mobile devices.

Keystroke analysis performs fairly well in many cases to authenticate legitimate users and to reject impostors. The user non-interceptive biometrics supports the remote access scenarios that are helpful for some cases like off-site office location access. But as they are not active authentication modalities, their performance (e.g., true positive rate of authentication) is not as high as the earlier modalities. Hence when chosen intelligently, both user interceptive and non-interceptive modalities can give the user a level of flexibility and at the same time ensure an efficient and secure authentication process.

The present invention facilitates significant and continual authentication to existing cyber-enabled or computer systems (specifically, mobile devices such as smart-phones, tablets and PDAs). Two-factor based authentication is now widely used. The second factor typically is SMS or pin-code with the traditional password. Prior art systems, however, use a fixed set of modalities and only depend on user preferences in modality selection. In contrast, the present invention provides adaptive selection of the available authentication modalities and considers different factors other than only user preference that safeguards from the imposter not being allowed to make his or her own choice of modality, which presumably he or she has compromised. It provides the active and continuous authentication in an additional layer, where the modalities are adaptively sensing the active device, media and surroundings.

Mobile devices are widely used now to do online activities, such as, but not limited to, browsing emails, checking bank accounts, and maintaining social network. The present invention provides continuous authentication of users in the context of mobile devices. Smartphone accelerometer features provide a way to identify the user pattern of how he/she holds the phone, and thereby deciding the genuine user of the mobile device. This also provides a means of gait-based user authentication.

Similarly, by analyzing the typing motion behavior of the users, continuous authentication can be performed. Typing motion profiles for the registered users help in identifying the actual users. Touchscreen gestures can also be used to do continuous authentication in mobile devices. Along with gestures, virtual typing (typing using a touch-screen based keyboard) and touch based drawing (drawing shapes using finger) can be used in performing mobile based continuous authentication. The present invention provides continuous user authentication for all the existing devices, and does not depend on specific hardware or platforms.

In addition, the present invention also addresses the factor of operating locations (e.g., home, office or coffee shop). One authentication modality cannot be always trusted in every available device and media context. The present system considers this factor and provides an adaptive selection of modalities to the users as required. If any modality data is compromised, users are still able to be authenticated using the sets of non-compromised modalities, unlike prior art systems.

The present invention thus combines the advantages of multi-factor and continuous authentication under one system to provide a more trustworthy, resilient, and scalable solution for authentication, and thus possess several advantages over the prior art. By considering individual features of different authentication modalities, the search space becomes larger, which reduces the probability of the same set of authentication modalities being selected. The level of trust is increased as the system can select those specific features of the authentication modalities that have higher trustworthy values. Biometric and non-biometric authentication modalities can be used simultaneously. Selection of modalities is adaptive based on surrounding conditions, and thus avoids not being able to provide authentication if particular modalities cannot function. If the selected set of authentication modalities only contains multiple features of the same modality (e.g., two different features of the face recognition modality), then the user does not need to use another authentication modality, thereby reducing annoyance of the user, and presenting the appearance of a single factor authentication system while still remaining an advanced, multi-factor authentication system. Further, by avoiding repetition of static authentication factors, the system is less predictable to hackers, thereby significantly increasing security.

In one exemplary embodiment, the present invention comprises a system with a combination of seven authentication modalities: face recognition, fingerprint recognition, password, CAPTCHA, SMS, voice recognition, and keystroke analysis. Some modalities are active (i.e., need user intervention), while some modalities are passive (i.e., do not need user intervention). The features and computational logic for the modalities are stored on one or more computer servers, and a user is authenticated at various times with different modalities, as determined by the adaptive selection process of the present invention. In one embodiment, different modalities and related calculations are stored on different virtual machines (VMs), with the benefit of the modalities thereby being logically separate and run independently. A further benefit is that if any VM is compromised, the prevent invention will remove that modality from possible selections, and will be able to select from the remaining non-compromised modalities. FIGS. 4-6 show different levels of features for each of the authentication modalities for this exemplary embodiment.

Figure 3:
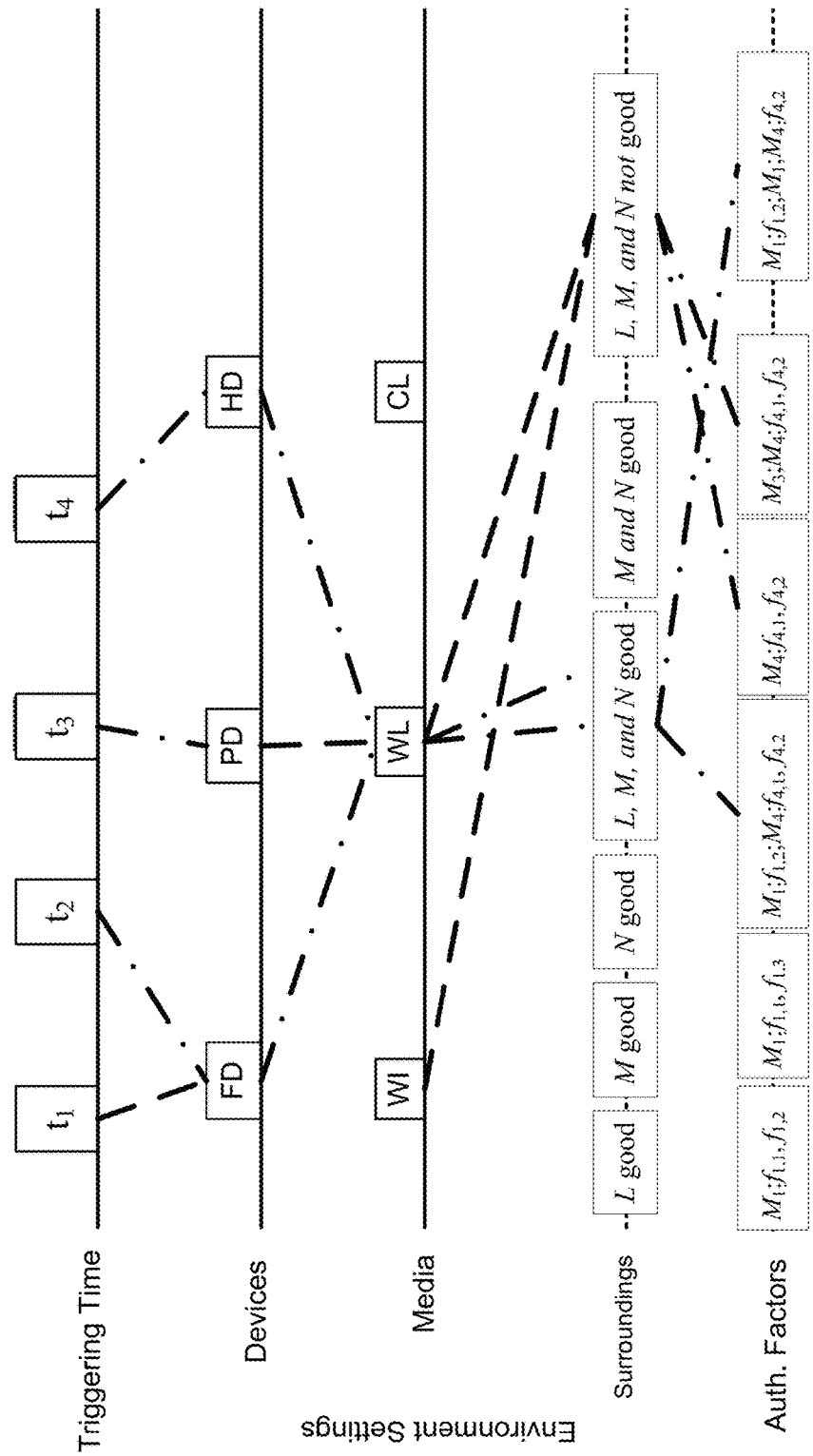
FIG. 3 shows an example of adaptive selection of a set of authentication factors in different device, media and surrounding conditions over time.

In this exemplary embodiment, a genetic algorithm (GA) is used for adaptive selection of modalities and their corresponding features using the active authentication process. Implementation requires the appropriate design of chromosome, contracts, objection functions, and penalty functions. As an initial matter, the criteria for selecting an authentication modality has to be determined. Criteria include, but are not limited to, variably of devices, media and environment. The GA is encoded to represent both modalities and their features in the chromosome (i.e., the chromosome is represented in two levels, modality and features. FIG. 7 shows an example of criteria for selecting authentication modalities. As seen in FIG. 3, these criteria may be triggered at different times by a user, and the selected set of authentication factors is expected to vary.

Different variants of device and media are considered to create constraints as well as objective and penalty function. The system uses a "trustworthiness" factor, which is expressed as a numeric value for particular types of devices and media, and signifies the impact of the device or media on a particular selected modality. In several embodiments, a higher value for trustworthiness factor indicates the particular modality is more trustworthy in the current settings. Trustworthiness factor determinations include, but are not limited to, consideration for the device (fixed device, portable device, handheld device), media (wired, wireless, cellular), documented historical or past vulnerabilities, user preference, and accuracy rate or false positive rate of the modality. Several of these considerations also can change with time and with user feedback, thereby resulting in changing trustworthiness values over time. This enhances the adaptive nature of the present, and helps prevent selection decisions from following any specific pattern.

In this exemplary embodiment, for an authentication triggering event, the present invention determines the trustworthiness value T for each possible modality M according to the following formula:

$$T(M) = \Sigma_i (aX_i + bY_i + c)$$

where a, b and c are constants serving as weights to the trustworthiness variables X (representing device) and Y (representing media), and where i represents a particular modality (e.g., modality number, 1-7). The constants/weights are adjusted for different environment settings.

The present invention then determines a penalty function incorporating computational complexity and cost along with a weighting factor, so that one modality is not always chosen in successive authentication triggering events. In one embodiment, the computational complexity of the modalities is the same in all devices and media where the same algorithm is used in different environment settings. A different algorithm for a single modality may be used in different environment settings, in which case the computation complexity is another objection function. In one embodiment, the penalty value for a modality ($P_M$) is determined according to the following formula $$P_M = w_f * P_f$$

where $P_f$ is the cost factor for the particular modality, and $w_f$ is the weight factor. The weight factor controls the effect of the cost factor while computing fitness values for a set of modalities during the selection process. The weights of modalities that were previously selected are increased (i.e., penalized more), so those modalities will not continuously repeat with subsequent selections, thereby avoiding patterns of selection.

In additional exemplary embodiments, the present invention further comprises a system and related methods for providing greater security and control over access to classified files and documents and other forms of sensitive information based upon a multi-user permission strategy centering on organizational structure. A user requests access to information or a resource using the MFA approach described above. If the multi-factor authentication process is passed, then based on the sensitivity or classification of the information being requested by a user, approvers are selected dynamically based on the work environment (e.g., mobility, use of the computing device seeking access, access policy, and the like).

Current defense-in-depth security practices mainly focus on external attacks and illegal access but with not enough emphasis on the unintentional misuse of access or malicious intent of legitimate users. In particular, mechanisms of user access to sensitive data rely completely on the users' trust. Today's organizations rely on either one policy for accessing all documents or on separate access policies for documents, without considering human factors, organizational structure and work flow (tasks and activity), and non-technical attacks such as social-engineering or collusion. By separating all these facets and creating enforcement mechanisms, it is necessary to provide flexibility to organizations for data access yet give them the control of setting the access policies for documents while minimizing the effect of above-mentioned factors. Although current systems maintain user access logs and activity logs, these can easily be deleted by malicious super or privileged users. The present invention addresses these problems with the prior art by establishing a protocol of shared responsibility among the users for access to sensitive resources on a network and elsewhere.

The present invention uses a trust model which embodies permission-granting strategies in order to prevent insider data breaches through shared responsibilities, in particular, user activities with classified data (i.e., which sensitive data are being accessed, when and by whom) are to be regulated via an approval process, so that a few others are aware of such an access. In several embodiments, shared-trustworthy access to classified data and services is provided via a multi-approver strategy, assuming that documents are already classified with risk quantification of information disclosure, and policies for user access exist. The system then monitors users' behavior by analyzing the legitimacy of their actions from the activity logs and approver logs. Any malicious/anomalous behavior then provides feedback to the multi-approver subsystem for intelligently deciding the approvers for a particular user for further access, forming a close-loop data-breach prevention and detection framework.

Any request for accessing a classified document needs approval from a set of users. However, fulfilling this request requires determining on what basis and how the set of approvers are chosen. As described below, the present invention provides a methodology for choosing a requisite number of approvers considering the organizational structure and classification level of the document and its associated security policy. Such a permission strategy takes into account the employee's role and hierarchy while determining the approvers, and is capable of supporting organizations of any size while handling permissions and resources of varying degrees of sensitivity.

Figure 8:
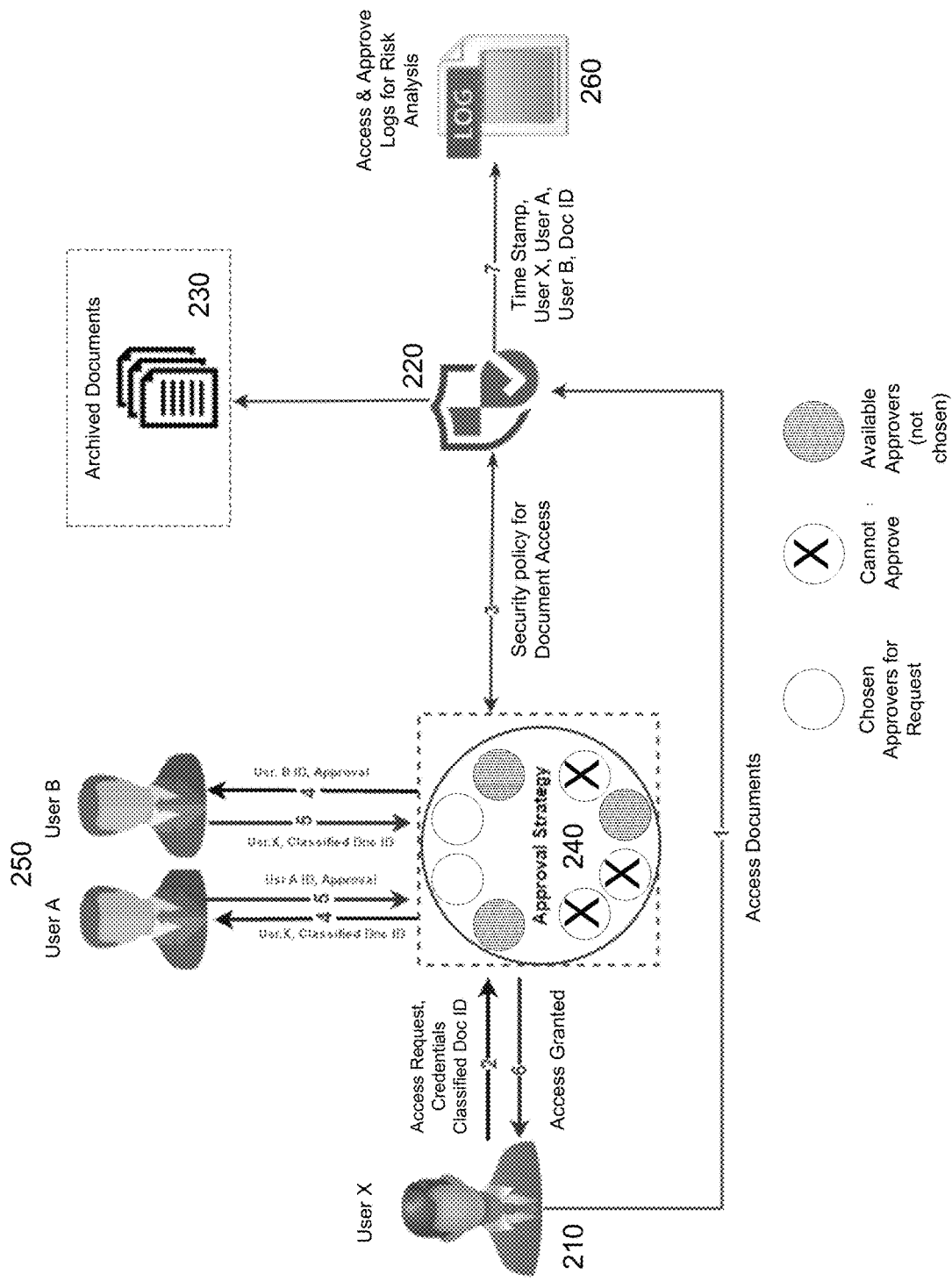
FIG. 8 shows a view of a system in accordance with an embodiment of the present invention.

FIG. 8 provides an overview of the multi-approval strategy of the present invention. After receiving a request from a user to access sensitive information, the system determines the number of approvals as well as finds the appropriate approvers and notifies them accordingly. When a user 210 requests access to a particular classified document 230 (Steps 1, 2), the organization's access control 220 checks the user's access rights according to the organization's access right policy. Then based on the shared trust policy (Step 3), it will choose a set of users 240 from the organization (based on the organization structure and the role of the user) who are available at that instance of time to act as approvers (User A and User B, and possibly more), notifying them to approve the request (Step 4). The identity of approvers chosen is disclosed to the requesting user 210 to prevent future security threats and collusion with other users. When all of the selected approvers 250 grant the request (Step 5), the requesting user 210 obtains access to the classified document (Step 6). The access or approver logs are stored 260, and are available for and will be analyzed for any incident detection or prevention of malicious behavior (Step 7), using on-line or off-line analysis techniques and methods.

An "organization" structure is represented as a graph/network dependent on the inter-relationship of the structure. That is, each organization has a specific hierarchical employee structure, roles and task assignments. An "employee" is a person (such as, but not limited to, a worker, contractor, officer, agent, independent subcontractor, or other individual) in or connected to the organization who has a role and performs different tasks/activities based on his/her job description. The "role" is a basis for establishing access control policies or a specific task competency for a user, including, but not limited to, a manager, supervisor, developer, or analyst. Roles define which individuals are allowed to access specific resources for a specific purpose. For example, a system operator's role may require access to all computer resources but not allow changing any access permissions, while a system administrator may change any user's access permissions but not approve any access permissions. The "workflow" in an organization may be uni-directional, bi-directional, or multi-directional in order to optimize productivity and reduce wastage of human efforts. A "document" includes any electronic object, including, but not limited to, files, messages, data, codes, information, or other forms of content. "Classified" refers to a document which is labelled or classified under a different category (such as top secret, secret, classified, proprietary, and so on.) based on the degree of sensitivity. Archived documents may be considered classified when they are stable (i.e., not under development or supposed to be modified) and have read access for use. "Clearance" or "permissions" refers to a user's ability to access classified documents. Approvals are required to access classified documents (CD), and the number of approvers may depend on the classification level of the document.

As an initial step to implementing the present invention, an access control graph for a subject organization is generated, based on the interrelationship among employees and their roles in an organization. This requires capturing information about the organization's specific hierarchical structures, roles, and task assignments. Since organizational capacity can vary over time, variations in number of employees/participants, roles, and the like, are supported. In several embodiments the organizational structure may be modeled or represented in an isomorphic relational graph using the stochastic Kronecker graph (SKG) model.

The problem then can be defined as follows, in the context of the organization (see FIG. 9). Given a collection of classified objects $\{Oj\}_{j\in}_{j\in\mathbb{Z}+_+}$ in an organization, having varying degrees of sensitivity $\{S_m\}_{m\in}_{m\in\mathbb{Z}+_+}$ that require $\{P_m\}_{m\in}_{m\in\mathbb{Z}+_+}$ number of permissions, such that if sensitivity $S_m$ is higher than $S_n$ then $P_m > P_n$, employee activities are governed by hierarchical role-based strategy, and follows the Bell LaPadula lattice model for access to an object, $O_j$. Let $R=\{Ri\}_{i\in}_{i\in\mathbb{Z}+_+}$ be the set of different roles; $A=\{Ai[j]\}_{i,j\in}_{i,j\in\mathbb{Z}+_+}$ be the set of various activities of the $i^{th}$ role; and $E=\{E_{ij}\}$ be the set of different employees working in various activities, $A_i[j]$. For the shared trust model, a unique set of permissions is required, which will also follow the same confidentiality model, and if an employee $E_{ij}$ wants to access an object $O_j$ having sensitivity $S_l$ that needs $P_l$ number of permissions, then the available set of employees $\{E_{rs}\} \subset E$ can give permissions if $i \leq r$, i.e., permission approvers must be employees of same or higher role than the requester.

Accordingly, a random graph model based on the Kronecker products of stochastic matrices are generated for representing hierarchical role-based access control of an organization. In this model, $$\theta^{\otimes[k]}_{N_1^k \times N_1^k} \in \mathbb{R}^{N_1^k \times N_1^k}$$

is the $k^{th}$ SKG, which can be considered as the graph, isomorphic to an organization's role hierarchy. It can be used as a method for simulating very large time-evolving random graphs. Moreover, using these simulated graphs, instead of real measured ones, it is possible to test algorithms on graphs even larger or denser than presently observed ones. Simulated graphs also allow one to judge which features of a real graph are likely to hold in other similar graphs and which are idiosyncratic to the given data set. SKGs can serve this purpose through model generation that has only a few parameters; however, parameter estimation poses unique challenges for these graphs. The main problem is that for a graph with n nodes (representing employees of an organization), the likelihood has contributions from n! permutations of the nodes. In practice, many thousands or millions of randomly sampled permutations may need to be used to estimate the likelihood. Even then it takes more than $O(n^2)$ number of operations to evaluate the likelihood contribution from one of the permutations.

In several embodiments, the present invention creates self-similar SKGs, recursively as different employees can only work for pre-defined roles of the particular organization. We begin with a primary initiator or generator graph $\theta$, with $N_1 \varepsilon \mathbb{Z}^+$ nodes and $E_1 \in \mathbb{Z}^+$ edges, and recursively produce larger graphs $G_1, G_2 \ldots$ such that the $k^{th}$ graph $G_k$ of $N_1^k (\in \mathbb{Z}+)$ nodes. The generator graph $\theta$ and later the optimum generator $\hat{\theta}$ can be created using the relationships among different roles of an organization. Hence, the $k^{th}$ graph $G_k$ can be considered as a relationship graph isomorphic to the structure of the organization. The degree of similarity depends on the perfect estimation of the optimum initiator $\hat{\theta}$. Moreover, the optimum generator contains different properties of the organization, such as the relationships among its different activities $\{A_i[j]:i, j\in\mathbb{Z}^+\}$ of various roles $\{R_i\}_{i\in}_{i\in\mathbb{Z}+_+}$, as the optimum generator has been constructed from the organizational hierarchy, chain-wise propagation of relationships among the employees with different roles, and the like. Additionally, these properties are propagated well through different subgraphs $G_1, G_2 \ldots$ to the final graph $G_k$, which has been considered as the isomorphic relationship graph of the organization. Consequently, $G_k$ contains most of the properties (such as number of nodes and edges, connected components, and the like) that can be found in the original relationship graph G of the respective organization as G has been estimated by the $k^{th}$ SKG $G_k$.

Figure 10:
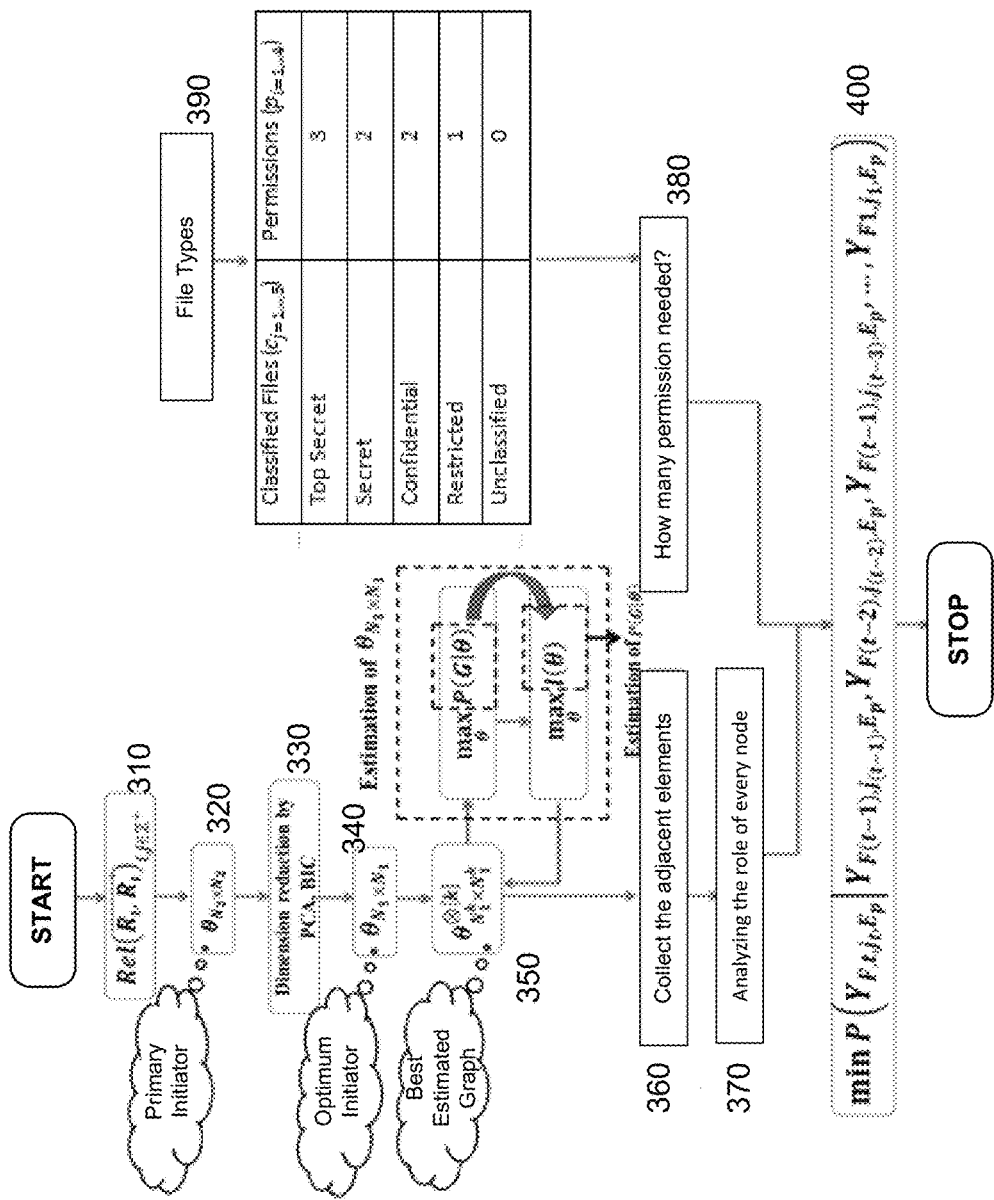
FIG. 10 shows a detailed view of a methodology for multi-permission selection in accordance with an embodiment of the present invention.

FIG. 10 shows a more detailed view of the multi-permission approval process of the present invention. The system first combines the role-based and task-based access control policy of the organization that defines relationships 310 among various employees working in different roles of the organization. It then constructs the primary/initial initiator or generator matrix $\theta$ 320, using the above relationships, that implicitly holds the properties of the organization hierarchy. It then finds the best initiator that will generate the relationship graph (among different employees) of the organization with the least amount of error (this comprises dimensional reduction of $\theta$ and optimal/best estimation) 330, 340, 350.

After forming the organization relationship graph, the next task is to find all the adjacent elements 360 of every node (i.e., user) of $G_k$, as some among them will give the permissions based on the sensitivity and confidentiality of the documents. The role of every node (i.e., user) is analyzed 370.

The number of permissions 380 ($p_i$; i=1, 2, ... n) required to access classified files ($c_j$, j=1, 2, ..., m) varies with their sensitivity or classification levels 390. FIG. 10 shows classifications of five levels such as top-secret, secret, confidential, restricted, and unclassified, although classification schemes with different numbers of classification levels can be used for a multi-permission strategy. Classification levels can change over time: for example, a test paper can be considered as a confidential document before the examination; however, it becomes public when the test is over. Hence, to implement this realistic situation, the number of permissions needed to be varied dynamically based on the status of the file and organizational security policy.

In several embodiments, the system eliminates lower-ranked employees (as determined using the organization hierarchy) from the list or pool of possible approvers. After judging the role of the employee requesting a particular file, all lower-ranked employees are eliminated from the sets of adjacent employees. While the number of highly-ranked employees working at an organization can be low, and thus reduces the size of the pool of possible approvers, the permission strategy may not be as applicable to them given their status. However, to broaden the pool of possible approvers for such high-ranked employees, the pool can be expanded to include lower-ranked employees within a certain level (e.g., one level below, two levels below, and so on).

The number of permissions needed for a particular file will be decided based on the confidentiality of the documents. Since the confidentiality of documents may vary with time, a stochastic optimization to evaluate the number of permissions is needed for a file at a particular time instance. It then generates a set of permission grantors 400, who are allowed to approve the access request of a particular user at a given time. The set of permission approvers for a file access request changes at any given time.

Finding a set of possible approvers for a user file access request thus can be based on potential approvers rank, availability, and other pertaining conditions. In several embodiments, the system incorporates the Key Result Area (KRA) of the employee. The number of separate permissions needed for approval may be based on the classification (secrecy) level. The system then determines in real time or near real time the set of permission approvers for the request (i.e., the subset of the set of possible approvers).

Selection of the set of approvers is non-repetitive, thereby reducing the chance of manipulation of the permission approvers. In several embodiments, when selecting the subset of permission grantors of the set of possible approvers, confirmation of the non-repetitive selection of the set of permission approvers is done.

The set of permissions for a file of a particular sensitivity type may vary with time to escalate the quotient of uncertainty for the legitimate/illegitimate user to guess the appropriate set of permission approvers at any time. In several embodiments, the system approaches this as a stochastic optimization problem to select the set of permission approvers for a file access at a specific time instance. Let $X_t$ be the set of permission approvers at time t. Let node $E_p; p \in \mathbb{Z}^+$ send a request for the file F, having a specific type of sensitivity at time t, $A_t(E_p)$ be the set of adjacent elements (at time t) of $E_p$, and $|A_t(E_p)|$ be the cardinality of $A_t(E_p)$. Let $Pw(A_t(E_p))$ be the power set of $A_t(E_p)$, having $2^{|A_t(E_p)|}$ number of elements. Here, the number of elements of $A_t(E_p)$ varies with time, as the number of employees working in the organization may vary with time.

Let $$X_{F,t,j_t,E_p} = \{\text{Rel}(\overrightarrow{E_p,E_l}), \text{Rel}(\overrightarrow{E_l,E_p})\} \; l \neq p; l, p \in \mathbb{Z}^+$$

be the set of $j_t \in \mathbb{Z}^+$ distances (at time t) of the permission approver nodes from $E_p$ for F, when $E_p$ sent a request at time t. For example, let $|X_{F,1,y1,E2}|$ be the number of distances from node $E_2 \in G_k$ to its adjacent nodes at time t=1, which may change at t=2. The set $X_{F,t,jt,Ep}$ can also be defined as the set of distances of all the elements of $A_t(E_p)$ from the node $E_p$. Next, the approver, $Y_{F,t,j,Ep} \in Pw(A_t(E_p))$ is defined as $$Y_{F,t,j,E_p} = \frac{1}{\sqrt{2}} \sum_{E_l \in A_t(E_p)} e^{-\text{Rel}(\overrightarrow{E_p,E_l})}$$

Then, to reduce the chance of repetition in the set of selected approvers, the following problem is solved:

$$\min P(Y_{F,t,j_t,E_p} | Y_{F(t-1),j_{(t-1)},E_{p'}}, Y_{F(t-2),j_{(t-2)},E_{p'}}, Y_{F(t-1),j_{(t-3)},E_{p'}}, \ldots, Y_{F1,j_1,E_p})$$

Employee U E G has m number of adjacent employees and among them $m_U \in \mathbb{Z}^+$ number of employees are unavailable. Hence, the number of active adjacent employees for U is $(m-m_U)$. Now, by way of example, for a top secret file the selected set of permission approvers must contain three employees. If the number of adjacent employees is large, then the active adjacent employees also is likely to be large, and the probability of any employee being selected is low, making the set of three permission grantors very likely to be non-repetitive (i.e., the set will contain at least one different permission approver). This makes is very hard to guess the set of permission approvers based upon prior selections.

Figure 11:
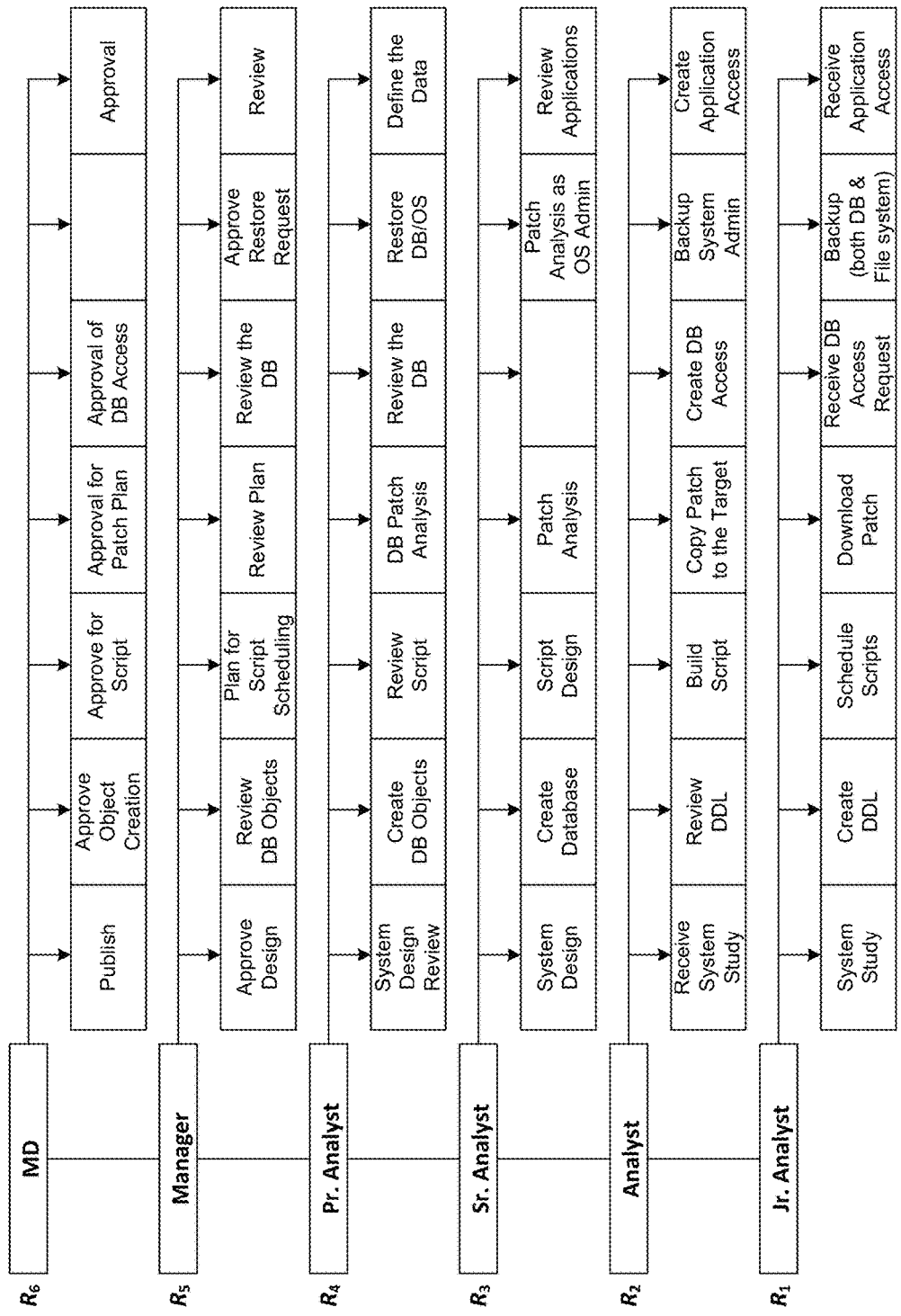
FIG. 11 shows an example of an organizational roles and activities table.

By way of example, consider an organizational structure with six levels of administrative role hierarchy, and each role has multiple activities, as seen in FIG. 11. Here, Managing Director (or MD) (R6) has the topmost administrative role. A Managing Director has multiple Managers (R5) under him/her, and each Manager has a number of Principal Analysts (R4), Senior Analysts (R3), Analysts (R2), and Jr. Analysts (R1). The hierarchical structure of the organization along with different activities (shown horizontally in FIG. 11), where R1<R2<R3<R4<R5<R6 is the partial order relationships among various roles of the organization. Consequently, it can be denoted by R1⇆R2⇆R3⇆R4⇆R5⇆R6.

FIG. 12 shows the role-activity mapping for the organization. Some of the employees in same role can have some common activities. From the raw data set it can be seen that A3[4] (patch analysis and apply patch) and A3[6] (push OS and DB patch to OS admin) have common employees. For example, the employee who submits a patch request can also analyze the patch and apply it. Hence, the intersection of E34 and E36 is non-empty, i.e., (E34∩E36)≠φ. Detailed information regarding the number of common employees can be seen in FIG. 13.

Similarly, A3[4] and A3[7] (review application logs) have common employees, i.e., an employee working in patch analysis can also review the application logs. Furthermore, A2[4] and A2[6] also have some common employees, so that employees working for patch copy are also working for system backup. Lastly, common employees also are found in A1[5] (receive DB access request) and A1[7] (receive application access). For this example, the remaining activities do not have any common employees (of course, this may not be the case for other organizations).

Relationships among different activities of different roles are shown in FIG. 7, which demonstrate that the lower level activities have relationships with their different consecutive higher level activities. For example, employees working on A2[1] are the immediate superiors of the employees working on A1[1] as A1[1]<A2[1]. Hence, E11 employees have to report to E21. Similarly, E21 employees have to report to E31 as A2[1]<A3[1]. It can be generalized as A1[1]<A2[1]<A3[1]<A4[1]<A5[1]<A6[1], which can be consider as simple or trivial relationships.

Figure 14:
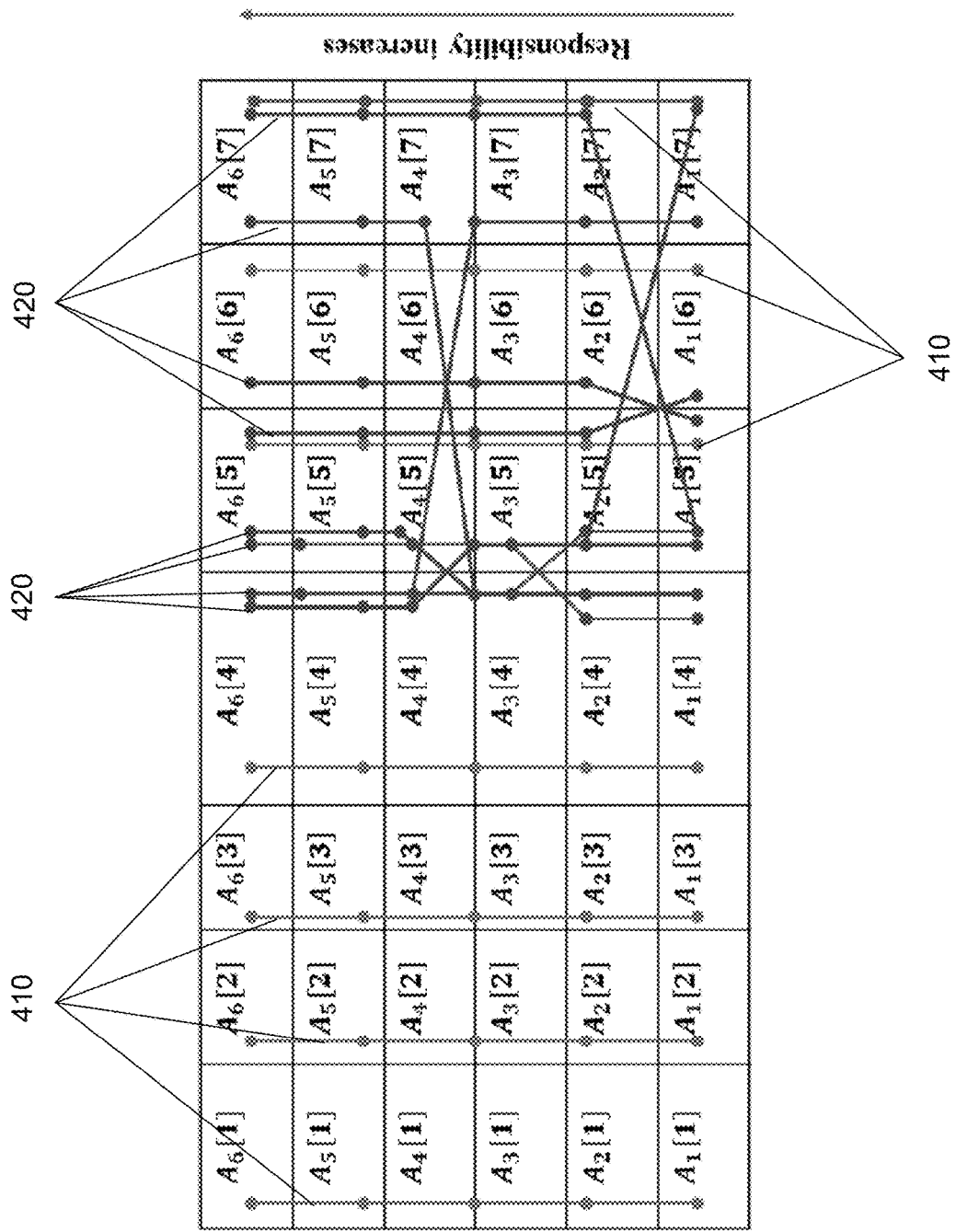
FIG. 14 shows hierarchical relationships among different activities of various roles for the organization of FIG. 11.

Similarly, A1[2]⇔A2[2]⇔A3[2]⇔A4[2]⇔A5[2]⇔A6[2] are the trivial relationships among the 2nd objectives of $\{R_i\}_{i=16}$ for the given dataset. All the "blue lines" 410 presented in FIG. 14 show the existences of trivial relationships. Again, the relationships become complex with the existence of common employees working on different activities.

For example, from the dataset, it can be found that 28 employees are working for both A1[5] and A1[7]. Hence, these employees have to report to both the employees working on the activities A2[5] and A2[7]. Then, the following relationships can be found:

A1[5]⇔A2[5]⇔A3[5]⇔A4[5]⇔A5[5]⇔A6[5] (Simple relationships)

A1[5]⇔A2[7]⇔A3[7]⇔A4[7]⇔A5[7]⇔A6[7] (Complex relationships)

A1[7]⇔A2[7]⇔A3[7]⇔A4[7]⇔A5[7]⇔A6[7] (Simple relationships)

A1[7]⇔A2[5]⇔A3[5]⇔A4[5]⇔A5[5]⇔A6[5] (Complex relationships)

Similarly, 21 employees are working for both the activities A2[4] and A2[6]. Consequently, the following simple and complex relationships can be found:

A1[4]⇔A2[4]⇔A3[4]⇔A4[4]⇔A5[4]⇔A6[4] (Simple relationships)

A1[4]⇔A2[4]⇔A3[6]⇔A4[6]⇔A5[6]⇔A6[6] (Complex relationships)

A1[6]⇔A2[6]⇔A3[6]⇔A4[6]⇔A5[6]⇔A6[6] (Simple relationships)

A1[6]⇔A2[4]⇔A3[4]⇔A4[4]⇔A5[4]⇔A6[4] (Complex relationships)

All the "red lines" 420 presented in FIG. 14 show the complex relationships among different activities of various roles ($\{R_i\}_{i=1}^6$ for the present example). Relationships among different activities of different role hierarchy can be considered as the primary initiator ($\theta_{42\times42}$) for this example, which is still very big. Hence, in some embodiments, it may be necessary to reduce its dimension to decrease complexity of graph generation as described in the appendices to the provisional applications as noted above, and incorporated herein by specific reference.

Assume that E22[1] has requested a file that needs three permissions for access. From the final reduced-dimension graph G it could be found that the number of adjacent elements (users) of E22[1] is 153 as follows: Adj(E22[1])={E12[1],E32[7],E42[19],E12[11],E32[1],E42[11],E32[7],E22[1],E42[8], . . . }.

Then, the number of sets of permission approvers for the top secret files requested by E22[1] is $$\binom{153}{3} = 1{,}170{,}552.$$

All the sets are equally likely with probability 1/1,170,552, which is very low. Hence, the selected sets of permission approvers are non-repetitive in nature. The selected sets also change with time (see example in FIG. 15).

Similarly, in case of the secret files, which require two permissions for access the maximum number of the sets of permission approvers is $$\binom{153}{2} = 11{,}628.$$

All the sets are equally likely with probability 1/11,628, which is still very low (see FIG. 9). Hence, the selected sets of permission approvers are non-repetitive in nature, making them very hard to guess.

The system thus mitigates privilege abuse risks by establishing a protocol of shared-responsibility among a group of users (e.g., employees in an organization). any request for accessing a classified or protected file or document needs approval from a set of approvers, rather than seeking approval from a single approver. The person requesting access does not know the set of approvers selected for a particular access request, and cannot determine their identities. Access and approver logs may be kept with proper retention for audit and risk analysis, such as when an incident is reported, as described below.

The present invention is applicable for various forms of organizations, enterprises, and governmental agencies. In several embodiments, the present invention comprises a method of accessing classified documents from an active archived system, in response to a user access request for classified data, information, or services. The system develops a multi-approver strategy to provide shared-trustworthiness access to the classified data, information and services. User access logs and approver logs are stored at a separate (which may be geographically separate) location under different control (thereby preventing a rogue "superuser" from accessing or erasing the log files to remove traces of malicious activities). These logs may be analyzed and a risk analysis performed when an unexpected or anomalous incident occurs. With high-bandwidth communication media and user-friendly applications on mobile computing devices, approvers will be able to grant or deny access requests in near real-time, so the delay in receiving access permission is bounded or limited.

Malicious or anomalous behavior provides feedback to the system for intelligently deciding the approvers for an particular user's access request, thereby forming a closed-loop data-breach prevention and detection framework.

The system design thus separates policy from the mechanisms of access control and execution of tasks. Today's organizations rely on either (one) uniform policy for all document access or on separate access policies for documents without other considerations such as human factors, organizational structure and work flow (tasks and activities), and non-technical attacks such as social-engineering or collusion. By separating all these facets and creating enforcement mechanisms, the shared-trust framework of the present invention provides the necessary flexibility for an organization yet gives the organization the control of setting the access policies for classified/sensitive documents while minimizing the effect of factors mentioned. The present system thus addresses issues such as, but not limited to, automatic enforcement of security policy, on-technical threats (e.g., social engineering and collusion). When a user requests access to a particular classified document, the response will be based on the shared trust policy from a set of users from the organization (based on the organization structure and role of the user) who are available at that instance of time to act as approvers notifying them to approve the request.

Accordingly, the invention also comprises a shared trust methodology for accessing classified documents (CD) from a computer/cyber system, comprising:

a) a mathematical formulation for mapping an organizational structure to a graph or network;

b) a multi-approver strategy for shared-trustworthy access (i.e. a user access request) to classified documents and services through an audit trail process;

c) high-bandwidth ubiquitous mobile devices, communication media and user-friendly apps technology (it is expected that an approver will be able to grant or deny access requests in near real-time so that there will be bounded delay in providing the access permission);

d) user access log and approver log are stored at a (geographically) separate location under different administrative control; and e) risk analysis (including analysis of accessor and approver logs) performed when an unexpected or anomalous incident occurs such as CD access attempts without approval, same user as requester and approver, discrepancy in access and approver logs, and the like.

The method further guarantees that the multi-approver subsystem forms a close-loop data-breach prevention and detection framework by intelligently deciding the approvers for a particular user's access request. The framework embodies the secure system design principles of separating the policy from the mechanisms of access control and execution of tasks.

Today's organizations rely on either (one) uniform policy for all type of document access or separate (fixed) access policies for privileged and guest users' access to sensitive documents without other considerations such as human factors, organizational structure and work flow (tasks and activities), and non-technical attacks such as social-engineering, insider threats, adversary attacks, and so on. By separating all these facets and creating enforcement mechanisms, our innovative shared-trust framework provides the necessary flexibility for an organization yet gives the organization the control of setting the access policies for classified/sensitive documents while minimizing the effect of above-mentioned factors. the shared-trust framework is designed and developed to automatic enforcement of a special security policy for classified document access. When a user requests such an access, the approver component gets activated, selects a set of users from the organization (based on the organization structure and role of the user) who are eligible and available to give permission to this access request. The approver component is to prevent data abuse by privileged users and also help in auditing sensitive record-storing systems. The set of approvers chosen remains unknown to the requesting user to prevent future compromise and security threats. That is, the file requesting user does not know who are the exact approver(s) and hence cannot collude with them. Only when the approver approves the access request, the user obtains access right to the classified document. the components will record the corresponding information in the access or approver logs. Such logs can help to handle non-repudiation, be analyzed for any unauthorized access or prevention of malicious (insider) behavior. Selecting a set of possible approvers for a user file access request depends on their rank, availability, and other pertaining conditions, but may be flexible based on the type and size of the organization.

The user "access log" provides a history of users' access for offline (after-the-fact) analysis to detect unauthorized access but highly skilled rogue super-users can erase such log files in order to remove the trace of their malicious activities, making off-line analysis ineffective. So storing these (user access log and approver log) at (geographically) separate locations under different administrative control will prevent such malicious insider threats and data breaches. The strong mathematical modeling guarantees the selection of appropriate approvers in a near real-time fashion for a large-size organization (with hierarchical structure).

The above methodologies can be used in conjunction with the adaptive selection of multiple modalities for authentication in different operating environments, which incorporates a novel approach of calculating trustworthy values of different authentication factors under various environmental settings, as described in further detail above In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for accessing classified documents or resources on a computer network, comprising the steps of:
   receiving from a first user an electronically-communicated request to access at least one classified document or resource of an organization stored on a computer network, wherein said at least one classified document has a classification level;
   ranking one or more authentication modalities to use for authentication of the access request from the first user;
   applying said one or more authentication modalities in order of ranking to the access request from the first user;
   after authenticating the access request from the first user, generating a set of possible approvers for the access request from the first user, wherein the set of possible approvers is determined using an access control graph providing relative roles and rankings of employees in the organization, and is based on a possible approvers' rank with respect to the first user, and the current availability of the possible approvers;
   determining the number of separate approvals required for access to the at least one classified document or resource,
   generating a set of permission grantors from the set of possible approvers, wherein the size of the set of permission grantors equals the number of separate approvals required;

transmitting requests for permission for the first user's access request to the set of permission grantors;

receiving approvals in real time or near real-time from the set of permission grantors; and providing the first user access to the requested at least one classified document or resource.

2. The method of claim 1, wherein the number of separate approvals required for access is based on the classification level of the at least one classified document.

3. The method of claim 1, wherein the set of possible approvers is based on the key result area (KRA) of the first user.

4. The method of claim 1, where communication with the permission grantors is through high-bandwidth mobile devices operated by the permission grantors.

5. The method of claim 1, further comprising the steps of:
maintaining a user access log; and
maintaining an approval log.

6. The method of claim 5, wherein the user access log and approval logs are stored at a geographically remote and separate location from the computer network of the organization.

7. The method of claim 5, further comprising identifying high-risk events or activities.

8. The method of claim 7, wherein the high-risk events or activities include unexpected or anomalous incidents, discrepancies in access and approval logs, and instances where the first user also is an approver.

9. The method of claim 1, wherein generating a set of possible approvers further comprises automatic implementation of an organizational security policy for classified document or resource access.

10. The method of claim 1, wherein the set of permission grantors for the first user's access request is non-repetitive.

11. The method of claim 1, wherein the set of permission grantors for the first user's access request is not known to the first user.

12. The method of claim 1, wherein the step of ranking one or more authentication modalities comprises the steps of:

determining the objective trustworthiness value for each modality based on user access device trustworthiness factors and user connection media trustworthiness factors for said modality;

determining a penalty value for each modality based on the computation complexity cost factor for said modality and the previous selection history of said modality for previous authentication verification events; and ranking the authentication modalities based on the objective trustworthiness value and the penalty value.

13. The method of claim 12, wherein the user input devices comprise fixed devices, mobile devices, hand-held devices, or combinations thereof.

14. The method of claim 12, wherein the user connection media comprise wired, wireless, cellular, or combinations thereof.

15. The method of claim 1, wherein said authentication modalities comprise one or more of the following modalities: facial recognition, fingerprint recognition, password, CAPTCHA, voice recognition, and keystroke analysis.

* * * * *